June 20, 1950  A. R. COOPER  2,512,224
REEL BLADE FORMING MACHINE
Filed July 12, 1947  4 Sheets-Sheet 3

INVENTOR.
Allyn R. Cooper.
BY Bair & Freeman
Attys.

June 20, 1950  A. R. COOPER  2,512,224
REEL BLADE FORMING MACHINE
Filed July 12, 1947  4 Sheets-Sheet 4
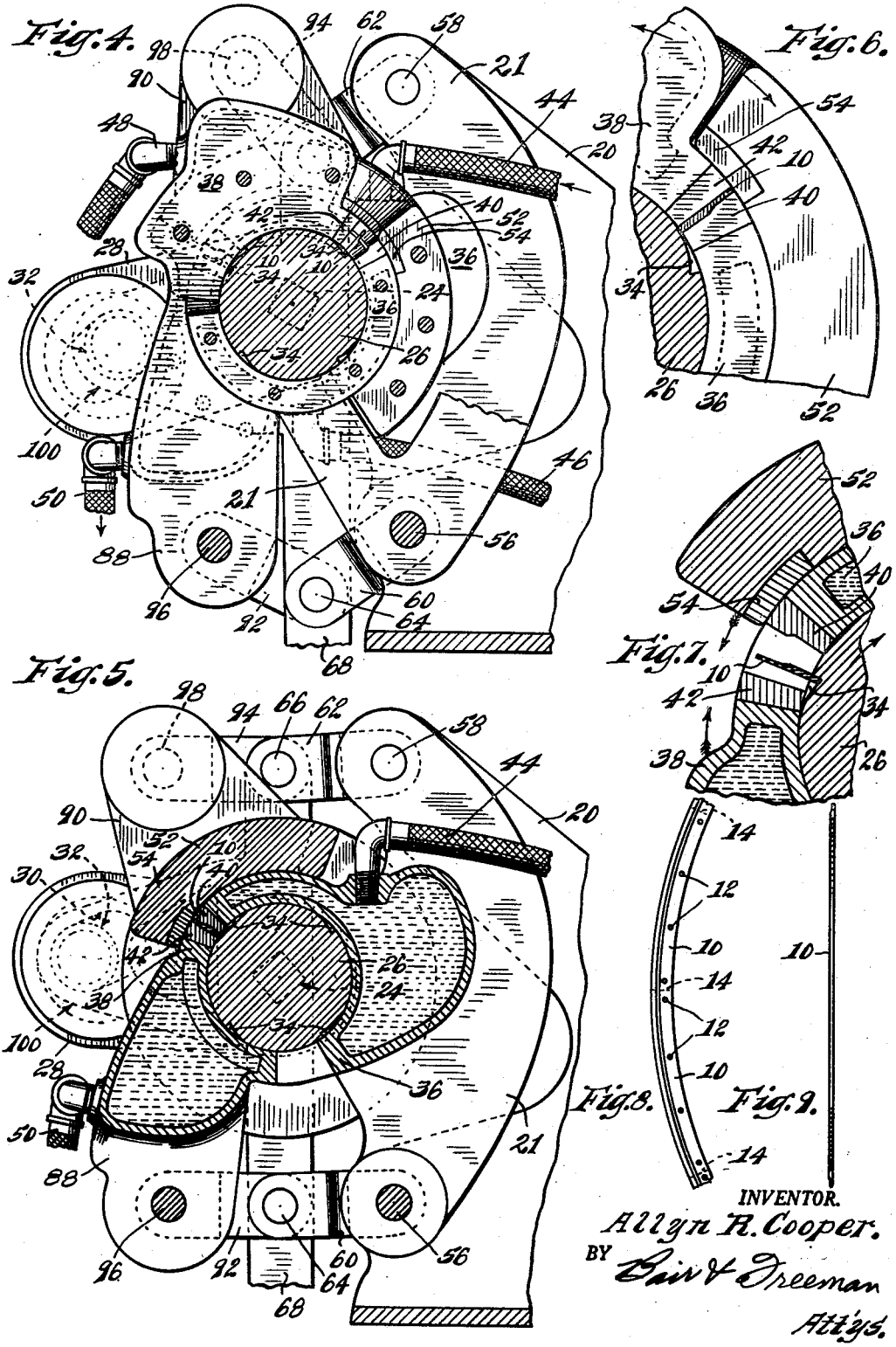

Patented June 20, 1950

2,512,224

UNITED STATES PATENT OFFICE 2,512,224

REEL BLADE FORMING MACHINE

Allyn R. Cooper, Marshalltown, Iowa

Application July 12, 1947, Serial No. 760,683

10 Claims. (Cl. 153—78)

This invention relates to a machine for accurately forming the twist in a reel blade of a lawn mower cutter reel.

One object of the invention is to provide a machine which forms a reel blade to the proper twist and with much greater accuracy than has been heretofore possible, whereby a reel blade formed in my machine can be assembled in a mower reel and will require but a minimum of grinding to bring the reel blade edges to true cylindrical form so that they can properly coact with the ledger bar of the mower.

Another object is to provide a machine which is rugged and durable so that it can be used on a production basis and which is efficient for maximum production, the machine being capable of receiving a heated reel blade which has been twisted to the approximate shape desired and perform a final forming operation thereon resulting in the blades coming from the machine with uniform twist and with a minimum of rejects due to improper forming and of proper hardness for use.

Another object is to provide a forming machine in the form of a cylindrical surface on which a curved and twisted reel blade in heated condition may be deposited between opposed spirally arranged jaws, one of which is stationary and the other movable, the movable jaw thereupon being moved toward the stationary jaw for forming the reel blade between the two under hydraulic pressure, a timing mechanism being associated with the machine for releasing the movable jaw at the end of a predetermined time period during which the reel blade is cooled by the jaws to a temperature that sets the shape in the blade and gives the proper hardness.

Still another object is to provide the cylindrical surface with cam notches, and a hood slidable over the jaws, with the reel blade confined between the opposed jaws and between the opposed hood and cam notches so that it is definitely positioned in relation to the jaws whereby an accurate twist can be imparted to the blade by reason of the jaws uniformly pressing the blade throughout its length under great hydraulic pressure.

A further object is to provide means for cooling the jaws by water jacketing them whereby the blade is cooled to a temperature that produces a set in the blade and gives the proper hardness in a minimum of time to thereby minimize the time required for the machine to operate on each reel blade.

Still a further object is to provide hydraulic means to operate the jaws, the hood and the cylinder having the cam notches therein, with the jaws being operated through a toggle linkage that progressively multiplies the hydraulic pressure as the jaws squeeze the reel blade between them.

With these and other objects in view, my invention consists in the construction, arrangement and combination of the various parts of my machine whereby the objects contemplated are attained, as hereinafter more fully set forth, pointed out in my claims and illustrated in the accompanying drawings, wherein:

Figure 4 is a sectional view on the line 4—4 of Figure 2.

Figure 5 is a sectional view on the line 5—5 of of Figure 2 showing the parts in blade squeezing position.

Figure 6 is an enlarged view of the right hand end of the jaws which are shown also in Figure 4, Figure 6 showing them in the closed position.

Figure 7 is a sectional view similar to Figure 5 showing the left end of the jaws in the open position as distinguished from the closed position in Figure 5.

Figure 8 is a face view of a plurality of reel blades showing their shape in one step of the forming operation prior to the blades being received in my machine, and Figure 9 is an edge view of Figure 8.

Figure 1:
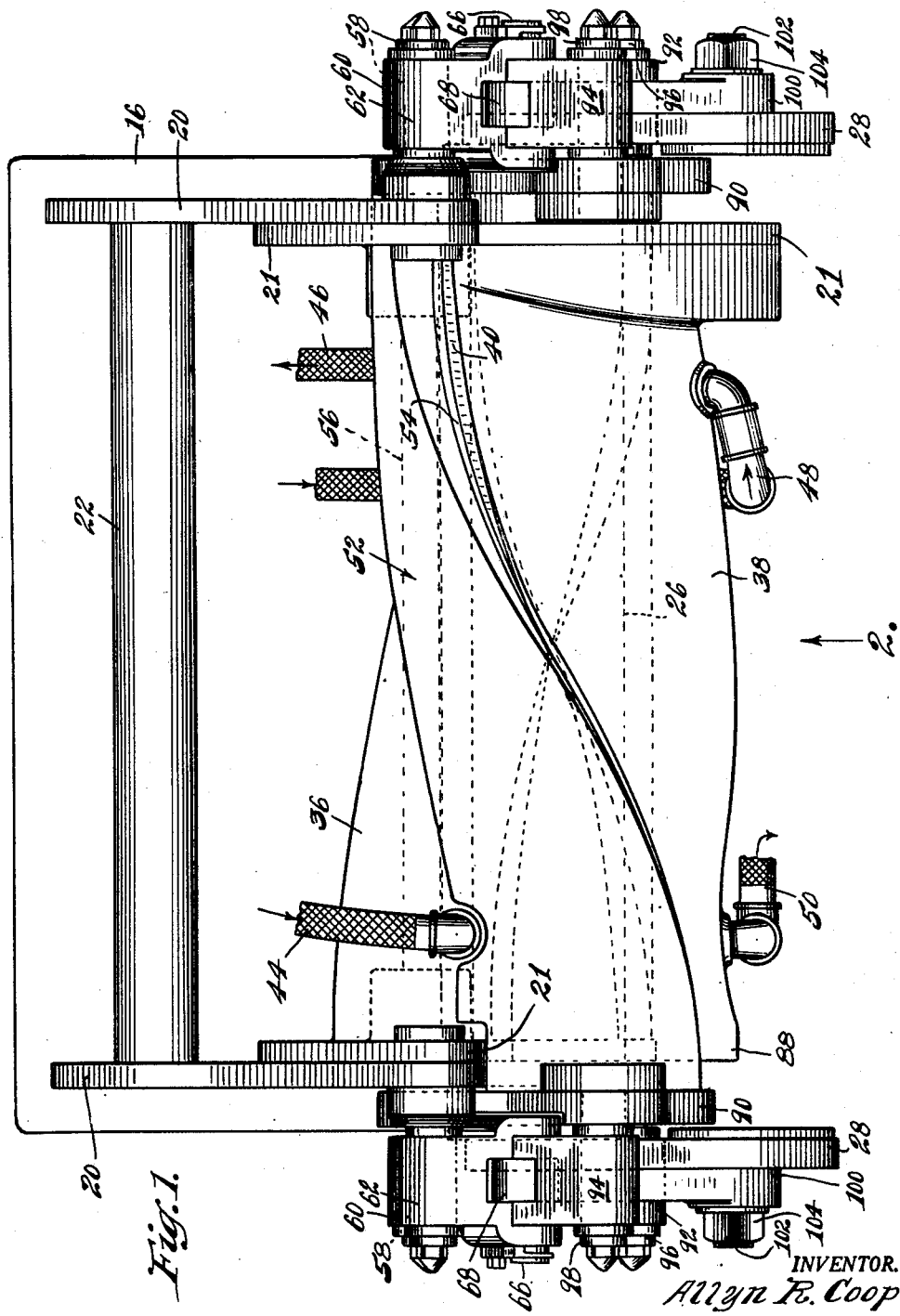
Figure 1 is a plan view of a reel blade forming machine embodying my present invention.

On the accompanying drawings I have used the reference numeral 10 to indicate a reel blade, this being the helically twisted cutter blade, several of which are secured to spiders or discs of a mower to form its cutter reel which cooperates with the ledger bar of the mower. These blades are straight bar stock of the cross section shown for instance in Figure 7 which are then punched with holes indicated at 12 to receive rivets or riveting the reel blades to the reel spiders or if they are to be welded to the spiders thus openings are omitted.

While cold, the blades can be bent as illustrated on Figure 8, the bending being in the plane of the blades as shown in Figure 9. After the blades are bent as in Figure 8 they may be cut apart as indicated at 14 so that individual curved blades result that do not have twist. The blades are then twisted while cold to the approximate desired shape by forming them in any suitable type of machine for this operation which can be purchased on the open market.

These machines have hereto been used but are not very accurate as to the final shape that the blade should be. Accordingly I provide the present machine which is capable of accurately forming the approximately formed blades to their final shape with the blade as it comes from my machine having a minimum of departure from a predetermined shape.

My machine for doing this consists of a tablelike frame 16 having supporting legs 18 on which a head frame 20 is mounted. The head frame is actually a pair of side frame plates which are suitably connected together by the frame 16 and a tie bar 22. A square shaft 24 has a cylinder 26 thereon rotatable in brackets 21 supported by the end plates 20. Outside of the brackets, levers 28 are connected to the shaft 24 and are provided with slots 30 to receive actuating rollers 32.

The cylinder 26 is provided with four spirally arranged cam notches 34, only one of which is used at a time. The cylinder can be turned a quarter turn after the one notch is worn and the other three notches thus used successively before the cylinder need be replaced.

A stationary jaw 36 surrounds a portion of the cylinder 26 and a movable jaw 38 surrounds another portion thereof. These jaws are provided with jaw faces 40 and 42, respectively, which are made of hardened steel to withstand the wear. Each jaw is in the form of a hollow structure whereby the jaw is water jacketed, the jaw 36 being supported by the brackets 21 and the various inlets and outlets for the jaws being shown respectively at 44, 46, 48 and 50. Ordinary city water is used, the rate of flow being regulated to correspond with the capacity of the machine.

In conjunction with the stationary jaw a hood 52 is oscillatably mounted thereon to move from the position of Figure 4 for instance where it leaves the space between the jaws open to the position of Figure 6 covering this space. The hood is provided with a hardened face member 54 to minimize wear.

The jaws 36 and 38 and the hood 52 are of course helically formed as will be evident from an inspection of Figures 1, 2, 4 and 5. They are adapted in the open position of Figures 4 and 7 to receive the partially formed blade 10 therein while the blade is at the critical hardening temperature of something like 1550° F. The operator picks a blade thus heated out of the furnace with a pair of tongs and drops it into the open jaws whereupon the jaws are closed as will hereinafter appear.

The frame plates 20 are provided with pivots 56 and 58 on which toggle links 60 and 62 are pivoted. The brackets 21 are also mounted on the pivots 56 and 58. The toggle links carry pivots 64 and 66 with which an operating link 68 is connected. The link 68 extends downwardly to a pivot 70. The links 60, 62 and 68 are duplicated at opposite ends of the machine and there are two of the pivots 70 carried by a beam 72. The center of the beam 72 is connected to a piston rod 74 which extends inside a hydraulic cylinder 76 and connects with a piston 78 therein. The hydraulic cylinder is provided with pintles 80 pivoted in brackets 82 supported by cross bars 85 of a frame 84—86 connected with the legs 18.

The hydraulic cylinder 76 being pivoted at 80 and the linkage arrangement being as described predetermines the movement of the pivots 70 with the pivots 80 permitting the pivots 70 to follow the lower ends of the links 68. The linkage arrangement is for operating the movable jaw 38 and the movable hood 52. This is accomplished by rotatably mounting the jaw 38 on the cylinder 26, forming on the jaw at each end a downward arm-like extension 88 and forming on the hood an upward arm-like extension 90.

Toggle links 92 and 94 are pivoted to the pivots 64 and 66 and to pivots 96 and 98 carried by the arms 88 and 90. With the parts in the position shown in Figures 3 and 4, these arms are swung toward the right, whereas when the parts are in the operated position of Figure 5 they are swung toward the left with the toggle links almost in alignment for maximum pressure of the jaws against the reel blade in the closed position of the jaws.

Figure 3:
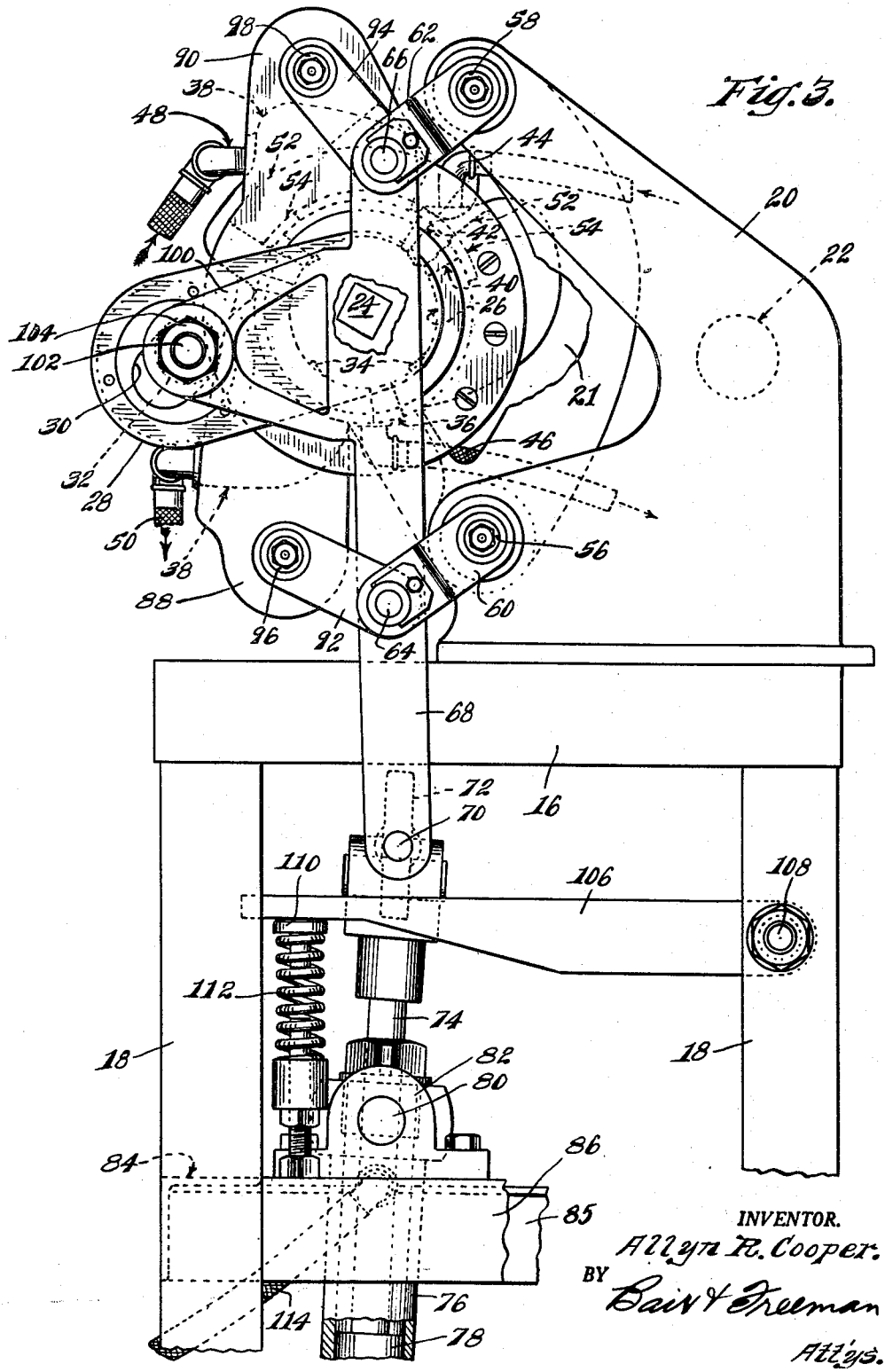
Figure 3 is an end elevation of Figure 2 looking in the direction of the arrow 3 adjacent Figure 2, showing the jaws in the open position, the operator's position being at the left.

The links 68 carry triangle shaped extensions 100 projecting toward the left in Figure 3 and these projections are provided with studs 102 that carry the rollers 32, lock nuts 104 being provided to hold the studs in position. In moving from the position in Figure 4 to the position in Figure 5, the links 68 impart clockwise rotation to the cylinder 26, and impart counterclockwise rotation to the hood 52 and clockwise rotation to the movable jaw 38. The rollers 32 move outwardly in the slots 30 as obvious by comparing Figure 5 with Figure 4 and the slots are inclined upwardly and inwardly thus speeding up the swinging action of the cylinder 26 to give it sufficient movement for the cam notches 34 to move from the position of Figure 4 to the position of Figure 5 thus camming the reel blades out tightly against the hood.

The ends of the beam 72 normally rest on levers 106 pivoted at 108 (see Figure 3) which levers are supported on shock absorbers 110 of spring type, the springs being shown at 112. Thus when the beam returns to the lowered position as shown its movement is checked by the shock absorbers.

Figure 2:
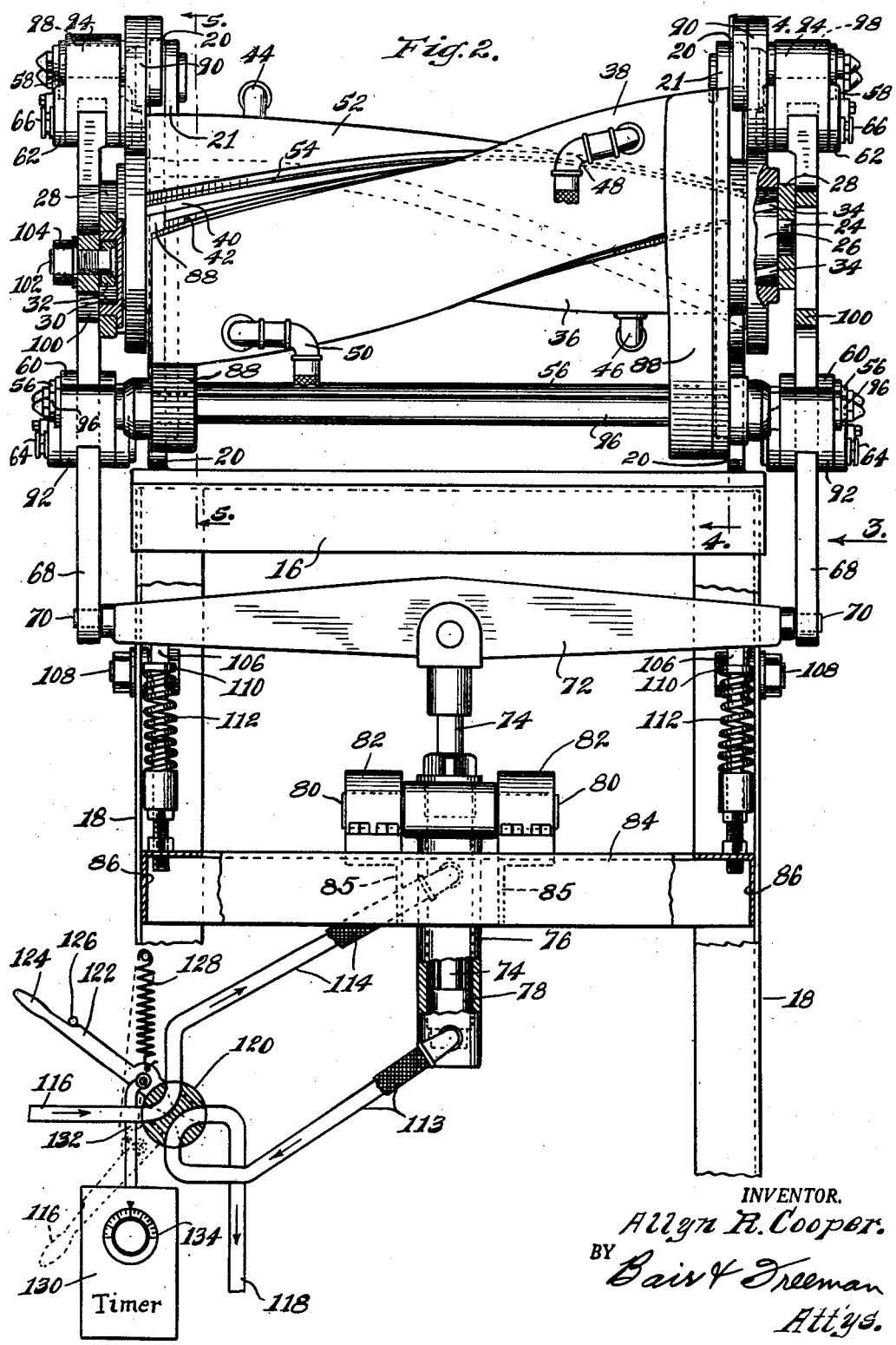
Figure 2 is a rear elevation thereof looking in the direction of the arrow 2 adjacent Figure 1 which is the position occupied by the operator of the machine.

The hydraulic cylinder 76 has lower and upper hydraulic connections 113 and 114 which may be connected with a hydraulic system, such as shown diagrammatically in Figure 2. Oil under pressure is supplied at 116 as by means of a pump and returned at 118 to a reservoir in a well-known manner. A four-way valve 120 serves to illustrate how the cylinder can be controlled, the valve being shown in the position for returning the piston 78 to the lower end of its stroke.

The valve 120 has a lever 122 extending therefrom and terminating in a foot pedal 124. The lever is normally held against a stop 126 by a spring 128. When the pedal is depressed as to the dotted position, the oil flow is reversed for supplying oil to the hydraulic line 113 and permits its return from the line 114.

A timer 130 is connected with the pedal 122 as by a link 132. The timer is designed so that at the expiration of a predetermined time period it will release the foot pedal so that it returns to the initial position. The timer can be set as desired by a dial 134. Timing of course depends on such factors as the quality of the steel, its temperature when placed in the machine, the temperature of the cooling medium for the jaws, and the temperature desired in the reel blade at the end of the forming operation in my machine. In one type of steel I have found that this temperature can be about 950° F. as the reel blade has taken its set by the time it reaches this temperature and will not warp thereafter when subsequently heated to the necessary temperature for tempering the blade.

*Practical operation*

In the operation of my machine the parts are normally in the position of Figures 3, 4 and 7 with the jaws open to receive a reel blade which has been roughly formed to helical shape. The blade after being heated to whatever temperature is necessary, for instance 1550° F. (this temperature varies with different qualities of steel) is dropped between the open jaws 40 and 42 and the operating pedal 124 is depressed by the operator. This reverses the valve 120 so that the piston 78 is elevated for moving the parts from the position of Figure 4 to the position of Figure 5.

As already explained, this closes the movable jaw face 42 on the reel blade 10 and forces it against the stationary jaw face 40, and at the same time moves the hood face 54 from the position of Figures 4 and 7 to the position of Figures 5 and 6, thereby completely closing the jaws around the reel blade. At the same time the cylinder 26 is rotated clockwise to the position of Figures 5 and 6 which causes the cam notch 34 in engagement with the lower edge of the blade to force the blade outwardly to the periphery of the cylinder 26. The periphery forms the fourth side of the enclosure for the blade. The blade is thus confined in a definite space which is of the proper helical twist to impart to the blades identical twists with maximum accuracy.

The parts of course are so dimensioned that when the toggle links are almost on dead center as in Figure 5 the movable jaw has been stopped by the reel blade itself and tremendous pressure can be exerted on it uniformly throughout its length by the face 42. In the machine as designed this pressure is on the order of seven tons which can be practically secured by the linkage arrangement, the hydraulic arrangement and the construction of the machine with rugged frame elements and operating parts. This high pressure also brings the jaw faces 40 and 42, which are cooled by conduction from the jaws 36 and 38, into intimate contact with the blade 10. The jaws themselves are cooled by the water which constantly flows through their jackets to carry away the absorbed heat. This results in less time required in the machine for predetermined cooling of the blades to a temperature where they take a set.

By providing the timer 130, each blade is accurately timed as to its being held between the jaws, thus insuring uniformity and speeding up production by minimizing the possibility of human error as would be the case if the operator were depended upon to manually hold the pedal 124 in depressed position during the desired timing period. This period is approximately 18 seconds in a machine of the kind herein disclosed which has been in practical operation for some time.

From the foregoing specification it is obvious that I have provided a machine which can accurately form a reel blade as to its helical twist with maximum accuracy which results in a minimum of finishing operations after the blades are formed. The blades are mounted on the reel spiders after they have been formed and hardened and must then be "trued up" so that they present a true cylindrical surface to cooperate with the ledger bar in the mower. I have found with blades formed as herein disclosed a single pass or at most two passes of the grinder throughout the length of the reel is all that is necessary, whereas with reel blades formed in machines of the prior art several passes were necessary before the outer edges of the blades present a true cylindrical shape. All of these factors of course contribute to the speeding up of production and the maximum of production in relation to the number of man-hours and machine-hours required for a finished product.

Some changes may be made in the construction or arrangement of the parts of my machine without departing from the real spirit and purpose of my invention, and it is my intention to cover by my claims any modified forms of structure or use of mechanical equivalents which may be reasonably included within their scope.

I claim as my invention:

1. A reel blade forming machine comprising a cylinder adapted to support a blade and provided with a cam notch helically arranged, a pair of jaws relatively movable and having helically opposed faces adjacent said cam notch, a hood normally positioned with said jaws open and adapted to cooperate therewith to receive a helically twisted reel blade when said jaws are closed, said jaws and hood being mounted for rotation around said cylinder, and means to relatively move said jaws toward each other, to move said hood over the jaws to enclose the blade between the jaws and hood and to rotate said cylinder in a direction for said cam notch to propel said blade outwardly to confine its edges between the cylinder and the hood.

2. In a reel blade forming machine, a cylindrical blade support provided with a cam notch helically arranged, a pair of jaws relatively movable and having helically opposed faces adjacent said cam notch, a hood element normally positioned with said jaws open and adapted to cooperate therewith to receive a helically twisted reel blade when said jaws are closed, said jaws and hood being mounted to rotate around the axes of said blade support and means to relatively move said jaws toward each other, said hood element over the jaws, and said cylindrical blade support rotatably in a direction for propelling said blade outwardly toward said hood.

3. A reel blade forming machine comprising a blade supporting cylinder, a pair of jaws relatively movable and having helically opposed faces adjacent the surface of said cylinder, a hood normally positioned with said jaws open and adapted, in conjunction therewith, to receive a helically twisted reel blade upon closure of said jaws, and means to relatively move said jaws toward each other and said hood over the jaws to enclose the blade between the jaws and hood, said jaws and hood during such movement rotating about the axis of said cylinder.

4. A reel blade forming machine comprising a blade supporting cylindrical element provided with a cam notch helically arranged, a pair of jaws relatively movable and having helically opposed faces adjacent said cam notch, a hood element normally positioned with said jaws open and adapted to, in conjunction therewith, receive a helically twisted reel blade upon closure of said jaws, said jaws and hood being mounted for rotation about the axis of said cylindrical element, and means to relatively move said jaws toward each other, said hood element over the jaws to enclose the blade between the jaws and hood and said cylindrical element rotatably in a direction for propelling said blade outwardly to confine its edges between said element and said hood, said means comprising an operating linkage connected with said hood and cylinder, and with said jaws by means of toggle links and hydraulic means for operating said linkage.

5. In a reel blade forming machine, a blade supporting cylinder, a pair of jaws relatively movable and having helically opposed faces adjacent said cam notch, a hood normally positioned with said jaws open and adapted to receive a helically twisted reel blade in conjunction with said jaws when they are closed, and means to relatively rotate said jaws toward each other and said hood over the jaws to enclose the blade between the jaws and hood, the axis of rotation being coincident with the axis of said cylinder, said means comprising an operating linkage connected with said hood and jaws by means of toggle links.

6. A reel blade forming machine comprising a blade supporting cylinder provided with a cam notch helically arranged, a pair of jaws relatively movable and having helically opposed faces adjacent said cam notch, a hood normally positioned with said jaws open and adapted to receive a helically twisted reel blade in conjunction with said jaws when they are closed, and means to relatively rotate said jaws about the cylinder axis and toward each other, rotate said hood about the cylinder axis and over the jaws to enclose the blade between the jaws and hood, and rotate said cylinder in a direction for its cam notch to propel said blade outwardly to confine its edges between the cylinder and the hood, said means comprising an operating linkage and hydraulic means for operating said linkage.

7. A reel blade forming machine comprising a blade supporting cylinder provided with a cam notch helically arranged, a pair of jaws relatively movable and having helically opposed faces adjacent said cam notch, a hood element normally positioned with said jaws open and adapted to receive, in conjunction therewith when said jaws are closed, a helically twisted reel blade, and means to relatively move said jaws rotatably about the cylinder axis and toward each other and said hood about the cylinder axis and over the jaws to enclose the blade between the jaws and hood, said last means also rotating said cylinder in a direction for propelling said blade outwardly to confine its edges between the cylinder and the hood, said means comprising an operating linkage connected with said hood and cylinder and with said jaws by means of toggle links, and hydraulic means for operating said linkage.

8. A reel blade forming machine comprising a cylindrical blade supporting element provided with a cam notch helically arranged, a pair of jaws relatively movable and having helically opposed faces adjacent said cam notch, a hood element normally positioned with said jaws open and adapted to receive, in conjunction therewith when said jaws are closed, a helically twisted reel blade, and means to relatively move said jaws and said hood about the axis of said element, said jaws toward each other and said hood over the jaws, to enclose the blade between the jaws and hood, said last means also rotating said element in a direction for propelling said blade outwardly to confine its edges between the cylinder and the hood, said means comprising an operating linkage connected with said hood and cylinder and with said jaws by means of toggle links, hydraulic means for operating said linkage, and means for controlling said hydraulic means, said last means being manually operable to position for effecting closure of the jaws and hood and movement of said cylindrical element, and time operated means to operate said hydraulic means in the opposite direction at the end of a selected time period.

9. A reel blade forming machine comprising a blade supporting cylinder, a pair of jaws relatively movable and having helically opposed faces adjacent said cylinder, a hood element normally positioned with said jaws open and thereby adapted to receive a helically twisted reel blade, and means to relatively move said jaws toward each other and said hood over the jaws to enclose the blade between the cylinder, jaws and hood, said means comprising hydraulic means, control means therefor manually operable to position for effecting closure of the jaws and hood, and timer operated means to release said hydraulic means at the end of a selected time period.

10. A reel blade forming machine comprising a blade support, a pair of jaws relatively movable and having helically opposed faces adjacent said support, a hood element normally positioned with said jaws open and thereby adapted to receive a helically twisted reel blade, and means to relatively move said jaws toward each other and said hood over the jaws to enclose the blade between said support, jaws and hood, control means therefor manually operable to position for effecting closure of the jaws and hood, and timer operated means to release said jaw and hood moving means at the end of a selected time period.

ALLYN R. COOPER.

REFERENCES CITED

The following references are of record in the file of this patent:

UNITED STATES PATENTS

| Number | Name | Date |
|---|---|---|
| 269,655 | Fiske | Dec. 26, 1882 |
| 340,024 | Williams | Apr. 13, 1886 |
| 843,203 | Frey | Feb. 5, 1907 |
| 1,004,801 | Marsh | Oct. 3, 1911 |
| 1,018,676 | Mulvey | Feb. 27, 1912 |
| 1,696,849 | Kelleher | Dec. 25, 1928 |
| 2,009,737 | Kulas et al. | July 30, 1935 |
| 2,441,275 | Keagle | May 11, 1948 |
| 2,461,034 | Castle | Feb. 8, 1949 |

FOREIGN PATENTS

| Number | Country | Date |
|---|---|---|
| 366,086 | Germany | Dec. 28, 1922 |